United States Patent Office 2,929,746
Patented Mar. 22, 1960

2,929,746

PROCESS FOR PURIFYING SUGAR

Giuseppe Assalini, Genoa, Italy, assignor to Rohm & Haas Company, Philadelphia, Pa., a corporation of Delaware No Drawing. Application June 2, 1959
Serial No. 817,467

9 Claims. (Cl. 127—46)

This invention relates to the purification of raw sugar juices.

Various procedures have been employed for the purification of raw sugar juice by means of ion-exchange resins. In practically every instance, the methods have been such that there has been substantially no acceptance thereof on an industrial scale. In those rare adoptions of ion-exchange techniques by the sugar manufacturing industry, the process employed invariably follows older, more conventional purification techniques. Such prior art purification measures typically may consist in adding several times a quantity of lime with double carbonation, with the consequent need for the installation of lime furnaces and turbo-compressors for $CO_2$. Otherwise, there may be employed a calco-sulfurous treatment. In any case, there are required repeated filtrations and heating, with consequent loss of heat and sugar and also waste of time and labor.

In my copending application, Serial No. 673,095, filed on July 19, 1957, and its predecessor application, Serial No. 571,770, filed on March 15, 1956, and since abandoned, I disclosed a means for overcoming the objectionable features of the prior art processes. That means consists of the use of synthetic ion-exchange resins for the purification of sugar juices as they are obtained from diffusion or crushing and pressing, the juices being derived from any raw material. The sugar to be purified may also be obtained from molasses. The process of that prior invention allows one to reduce or even eliminate any other previous method of purification, including the calco-carbonic and calco-sulfurous processes, thus economizing in the cost of plant, time, and labor. The present invention constitutes an even greater improvement over the methods of the prior art inasmuch as it does all that my prior invention (i.e., U.S. 673,095) did and does so with even greater efficiency, increased savings in time, materials, and equipment, and with the further result of a much-improved product.

In the copending parent case, of which this application is a continuation-in-part, the invention consisted in the treatment of the raw sugar juice with an anion-exchange resin in the hydroxide form so as to convert to the corresponding hydroxides any salts contained in said juice. The thus treated juice was then further treated with a water-soluble metal salt which yielded a water-insoluble metal hydroxide. The water-soluble metal salts which were employed were the sulfates or chlorides of aluminum, iron, or manganese. The water-insoluble metal hydroxides which they formed were of a flocculent character; and they served to coagulate the impurities from the sugar which were then eliminatable by decantation, sedimentation, filtration, and the like.

In the practice of the parent invention, there were certain drawbacks to its widespread commercial acceptance. For one thing, the preferred metallic salt, aluminum sulfate, and even some of the others which performed almost as well, are relatively too expensive. Even more important, the flocculent precipitates obtained thereby are such as to require expensive and relatively elaborate filtration equipment, the alternative being the consumption of excessively large periods of time to separate the purified juices from the precipitate. Similarly, chemical filter aids were necessary to speed up the process; but this, in turn, increased the cost of the highly competitive sugar purification operation.

One of the reasons for the excessive cost of the metallic salt used in my parent invention was that comparatively large quantities thereof were necessary in order to form the required flocculent precipitate. Apart from the cost, it was recognized that this was undesirable because it tended to introduce excessive quantities of foreign matter which, if not all converted to the filterable precipitate, might prove unsatisfactory. Another objection to this need for introducing so much of the metal salt solution was the fact that it drove down the pH of the sugar juice solution, from the 11 to 12 value which it had upon leaving the strongly basic anion exchanger, to about 5 to 6. Under the circumstances, care sometimes had to be exerted so as not to permit the pH to drop much lower in order to avoid inversion of the sugar which takes place under certain acidic conditions.

In my present improvement, all of the objectionable features of the parent invention are at one and the same completely eliminated. As before, I treat the raw sugar juices, or partly demineralized molasses, with a strongly basic anion exchanger. The effluent juices at this point have, as before, a highly alkaline nature with a pH of about 11 to 12. The juices are then treated with either $CaSO_4$ or $CaCl_2$, the former in an aqueous suspension or in its dry, powdered form (since it is essentially insoluble in water), and the latter in aqueous solution. At the high, initial pH, it appears that the organic non-sugar complexes in the sugar juices are broken, and the amphoteric amino acids and other such impurities are converted to their anionic form. When the calcium salts are added, they have no appreciable effect on the highly alkaline pH of the solution; and, under these conditions, the calcium ions are receptive to reaction with the amphoteric materials present so as to form insoluble salts therewith.

Since calcium sulfate is insoluble, its use in even large amounts in accordance with my present invention would not diminish the purity of the final product, or cause any special problems in connection with removal of any excess salt as it is readily filterable. Calcium chloride, of course, being soluble in water, is not in this same category. However, since only extremely small amounts of $CaCl_2$ effect the desired precipitation of the amphoteric materials, the quantities employed cause no significant adverse effect on the purity of the resultant product. The use of such small amounts of $CaCl_2$—and this also applies for $CaSO_4$—additionally causes a tremendous reduction in the quantity and cost of the reagents used in my parent invention. The significant improvement effected by use of $CaCl_2$ or $CaSO_4$, in lieu of the $Al_2(SO_4)_3$ of my former disclosure, may readily be seen from Examples 1 and 2 which follow.

EXAMPLE 1

An ion-exchange column was provided in which was installed 1.15 liters of a strongly basic anion-exchange resin to form a bed 60 cm. in height. This resin was of a well-known variety, constituting a porous, crosslinked styrene-divinylbenzene copolymer having quaternary ammonium hydroxide groups attached through a methylene group to the rings from the styrene and carrying on the nitrogen two methyl groups and a hydroxyethyl group. The resin was regenerated with 200 g. of NaOH as a 10% solution and washed with 10 liters of tap water.

A total of 5.0 liters of diffusion juice was passed through the ion-exchange column at the rate of 80 ml. per minute. This juice, which was an aqueous solution obtained from beet cosettes by diffusion, had the following analysis:

| Bx | Sucrose | Purity | pH |
|---|---|---|---|
| 15.65 | 13.40 | 85.62 | 6.3 |

The effluent collected had the following analysis:

| Bx | Sucrose | Purity | pH |
|---|---|---|---|
| 13.8 | 12.40 | 89.7 | 11.50 |

EXAMPLE 2

This effluent was divided into two equal parts, and each was used in carrying out the following experiments, all at room temperature:

To 2.50 liters was added 54 ml. of a 30% solution of $Al_2(SO_4)_3 \cdot 18H_2O$. Aliquots (500 ml., pH of 6) were then permitted to settle, and the amount of sedimentation which took place at the end of 10 minutes was measured by determining the volume of clear solution formed in a 500-ml. graduate. The clear liquid was decanted, and then the filtration rate was determined by filtering the rest of the solution through a 10-cm. cone funnel bearing a standard filter paper into a 500-ml. graduate and reading the volume of clear solution which formed at the end of an equivalent 10-minute interval. The same procedure was then employed with another aliquot, except that 54 ml. of a 30% solution of $CaCl_2$ was utilized instead of the $Al_2(SO_4)_3$. The results were as follows:

$Al_2(SO_4)_3$

| | Time (min.) | Volume of Clear Solution (ml. in 500-ml. graduate) |
|---|---|---|
| Sedimentation | 10 | 2.5 |
| Filtration | 10 | 75.0 |

| Bx | Sucrose | Purity | pH |
|---|---|---|---|
| 13 | 11.85 | 91.15 | 5.7 |

$CaCl_2$

| | Time (min.) | Volume of Clear Solution (ml. in 500-ml. graduate) |
|---|---|---|
| Sedimentation | 10 | 11 |
| Filtration | 10 | 210 |

| Bx | Sucrose | Purity | pH |
|---|---|---|---|
| 13.80 | 11.69 | 84.7 | 11.2 |

The foregoing results indicated that the precipitate which formed when $CaCl_2$ was used had a sedimentation rate which was apparently four times faster than the one formed when exactly the same amount of $Al_2(SO_4)_3$ was employed. Likewise, the filtration rate of the former was approximately three times faster than that of the latter. Of course, the drop in purity of the sugar product was greater in the case of the $CaCl_2$ than when $Al_2(SO_4)_3$ was utilized, due to the fact that an excess of $CaCl_2$ was used beyond the amount necessary to cause the desired precipitate and a resultant sugar product of acceptable purity. Comparative tests were run to demonstrate the effectiveness of $CaSO_4$ and also of mixtures of $CaCl_2$ and $CaSO_4$. The procedures and results are set forth in Examples 3—4—5 which follow:

EXAMPLE 3

A strongly basic anion-exchange column was employed like that described in Example 1 above, except that the resin was regenerated with 38 g. of NaOH as a 4% solution and washed with 7 liters of tap water.

A total of 7.5 liters of beet cosette diffusion juice was passed through the column at the rate of 80 ml. per minute. Analysis of this juice was:

| Bx | Sucrose | Purity | pH |
|---|---|---|---|
| 14.20 | 12.6 | 88.7 | 6.45 |

The effluent collected had the following analysis:

| Bx | Sucrose | Purity | pH |
|---|---|---|---|
| 12.80 | 11.8 | 92.19 | 11.10 |

This effluent was divided into three equal parts. One was used in carrying out the following experiments (the other two being used in the experiments described as Examples 4 and 5 below):

One 2.5-liter portion was further subdivided into four 500-ml. aliquots. To each of these aliquots was added an increasing quantity of a 30% suspension of $CaSO_4$. The degrees of sedimentation and filtration were determined in the same way as described in Example 1. The results were as follows:

*Volume of clear solution after 10 minutes*

[Ml. in 500-cc. graduate.]

| Amount of $CaSO_4$ | 5 ml. (=1.5 g.) | 10 ml. | 15 ml. | 25 ml. |
|---|---|---|---|---|
| Sedimentation | 10 | 10 | 30 | 50 |
| Filtration | 295 | 295 | 315 | 315 |

ANALYSIS OF PRODUCT

| | | | | |
|---|---|---|---|---|
| Bx | 12.6 | 12.6 | 12.6 | 12.4 |
| Percent Sucrose | 11.55 | 11.45 | 11.50 | 11.35 |
| Purity | 91.66 | 90.87 | 91.27 | 91.53 |
| pH | 10.9 | 10.85 | 10.95 | 10.95 |

EXAMPLE 4

A second 2.5-liter portion of the effluent mentioned in Example 3 was further subdivided into four 500-ml. aliquots. To each of these was added an increasing quantity of a 30% solution of $CaCl_2$. The degrees of sedimentation and filtration in a given time were determined as described in Example 1. The results were as follows:

*Volume of clear solution after 10 minutes*

[Ml. in 500-cc. graduate.]

| Amount of $CaCl_2$ | 1 ml. (=0.3 g.) | 2 ml. | 3 ml. | 4 ml. |
|---|---|---|---|---|
| Sedimentation | 1 | 5 | 5 | 11 |
| Filtration | 365 | 355 | 345 | 365 |

ANALYSIS OF PRODUCT

| | | | | |
|---|---|---|---|---|
| Bx | 12.8 | 12.6 | 12.8 | 13 |
| Percent Sucrose | 11.8 | 11.65 | 11.75 | 11.75 |
| Purity | 95.16 | 92.46 | 91.86 | 90.38 |
| pH | 11.50 | 11.20 | 11.20 | 11.20 |

EXAMPLE 5

A 500-ml. aliquot was taken from the third 2.5-liter portion of the effluent mentioned in Example 3. To this aliquot was added 1 ml. of 30% $CaCl_2$ (0.30 g.) and 20 ml. of 30% $CaSO_4$ (6 g.). The degrees of sedimentation and subsequent filtration in a given time were determined as described in Example 1. The results were as follows:

*Volume of clear solution after 10 minutes*

[Ml. in 500-cc. graduate.]

Sedimentation _____ 45
Filtration _____ 335

ANALYSIS OF PRODUCT

Bx _____ 12.4
Percent sucrose _____ 11.4
Purity _____ 91.9
pH _____ 11.0

A comparison of the data in the foregoing examples readily points up the earlier-mentioned significant improvements which the present invention makes over the process disclosed in my parent application. In comparison with $Al_2(SO_4)_3$, only relatively very small amounts of either $CaSO_4$ or $CaCl_2$, or a mixture of the two, are necessary to effect the desired precipitation and resultant sugar purification. This obviously accrues to the benefit of the user both in the savings of reagents and in the purity of the product, since such comparatively minor amounts of the flocculating material are introduced. The maintenance of the original highly alkaline pH which the effluent juices have after the ion-exchange treatment also works to the user's benefit by assuring maximum breaking up of the organic non-sugar complexes and their formation of insoluble salts with the calcium ions, and further assuring that no inversion of the sugar will take place due to the prevalency of acidic conditions.

EXAMPLE 6

Having thus successfully demonstrated, on a laboratory scale, the advance in the art caused by the present invention, further tests were then run on a commercial-type, pilot plant operation. In this connection, there was employed an ion-exchange column having the following specifications:

Diameter _____ 90–2 mm.
Vol. of resin _____ 5.0 liters.
Height of bed _____ 76 cm.
Resin _____ Strongly basic quaternary ammonium type, in the OH⁻ form, as described in Example 1.

For these runs, the resin was regenerated with 800 g. of NaOH as a 10% solution. The column was then washed with 35 liters of tap water at a rate of 0.335 liter per minute for the first 6 liters and then at 1.34 liters per minute at the 29th liter. Next, 32.5 liters of raw diffusion juice was passed through the anionic column, followed by 4 liters of water for displacing the sugar solution (sweetening-off). The first 3.5 liters of effluent was discarded; the subsequent 33 liters of solution was collected as product. The analytical data may be summarized as follows:

Influent—Bx, 12.65; percent sucrose, 10.70; purity, 84.7
Effluent—To 330 ml. was added 0.3 g. of powdered $CaSO_4$, then heated at 50° C. for 3 minutes, and filtered
Filtrate—Bx, 11.30; percent sucrose, 10.2; purity, 90.26

To 32 liters of the above effluent in a suitable mixing tank was added 90 grams of powdered, commercial $CaSO_4$ at 50° C. After 5 minutes' agitation, most of the $CaSO_4$ settled at the bottom of the tank. Quantities of liquor were drawn from the bottom and poured back into the tank. The desired flocculation occurred. After agitating 7 minutes longer, the liquid was permitted to settle for 5 minutes. About 16 liters of clear juice was decanted. The remaining 16 liters was filtered at 50° C. through a filter-press of two plates (normal cotton filter cloth, filter area 0.15 square meter). The filtration data were as follows:

| Time (mins.) | Filtrate (Liters/ 3 min.) | Pressure (atmos.) | Liters/ min./sq. meter |
|---|---|---|---|
| 3 | 4.80 | 1.2 | 10.6 |
| 6 | 1.26 | 1.2 | 2.8 |
| 9 | 0.79 | 1.2 | 1.7 |
| 12 | 0.44 | 1.2 | 0.97 |
| 15 | 0.41 | 2.2 | 0.91 |
| 18 | 0.40 | 1.2 | 0.88 |
| 21 | 0.39 | 1.2 | 0.85 |
| 24 | 0.32 | 1.2 | 0.71 |
| 27 | 0.26 | 1.2 | 0.58 |
| 30 | 0.25 | 1.2 | 0.55 |
| Total | 9.32 | Average | 2.28 |

The thickness of the filter cake varied between 5 mm. at the middle to 10 cm. at the edges.

EXAMPLE 7

Using the same column as in Example 6, regeneration was accomplished with 160 g. NaOH as a 4% solution (the rate was 0.335 l./min. or 0.067 bed-volume/min.). The column was then washed with 31 liters of tap water, at a rate of 0.335 liter/min. for the first 6 liters and then to 1.34 liters/min. at the 25th liter. Next, 32.5 liters of raw diffusion juice was passed through the column, followed by 4 liters of water for displacing the sugar solution. The first 3.5 liters of effluent was discarded. The subsequent 33 liters was collected as product. The analytical data may be summarized as follows:

Influent—Bx, 12.0; percent sucrose, 10.1; purity, 84.16
Effluent—To 330 ml. was added 1.0 gram of solid $CaSO_4$. After warming to 50° C., the liquid was filtered through a cone filter.
Filtrate—Bx, 10.9; percent sucrose, 9.80; purity, 89.9

To 30 liters of effluent were added 90 grams of solid $CaSO_4$. The liquid was heated to 50° C. in 3 minutes. Agitation was stopped. After 5 minutes, some 8.5 liters of clear liquid was decanted. The remaining liquid was filtered through a filter press (4 plates) which had a filter area of 0.06 square meter and employed cloth of the regular short-fiber type commonly used in the sugar factory. The filtration data were as follows:

| Time (mins.) | Filtrate (Liters/ 3 min.) | Pressure (atmos.) | Liters/ min./sq. meter |
|---|---|---|---|
| 3 | 0.980 | 2.5 | 5.44 |
| 6 | 0.420 | 2.6 | 2.33 |
| 9 | 0.340 | 2.6 | 1.88 |
| 12 | 0.300 | 2.6 | 1.67 |
| 15 | 0.240 | 2.6 | 1.33 |
| 18 | 0.220 | 2.6 | 1.22 |
| 21 | 0.190 | 2.5 | 1.06 |
| 24 | 0.170 | 2.5 | 0.94 |
| 27 | 0.160 | 2.5 | 0.89 |
| 30 | 0.160 | 2.5 | 0.89 |
| Total | 3.18 | Average | 1.77 |

The thickness of the filter cake averaged 3–4 mm.

EXAMPLE 8

Using the same column as in Example 7, regeneration and washing were accomplished as described therein. Then, 25 liters of the diffusion juice, followed by 4.0 liters of tap water, was passed through the column. After discarding the first 3.5 liters, the next 25 liters was collected as product. The analytical data follows:

Influent—Bx, 12.2; percent sucrose, 10.3; purity, 84.4
Effluent—To 8 liters, in a cylinder 14.8 cm. in diameter by 45 cm. in height, was added (at 22° C.) 24 g. of powdered CaSO₄. After being stirred gently for 2 minutes, the mixture was permitted to settle. The rate of sedimentation was measured as follows:

| Time (min.) | Cm. of Clear Solution | Liters of Clear Solution |
| --- | --- | --- |
| 1 | 3.4 | 0.58 |
| 2 | 7.5 | 1.29 |
| 3 | 10.5 | 1.80 |
| 4 | 13.0 | 2.23 |
| 5 | 14.2 | 2.44 |
| 6 | 14.9 | 2.56 |
| 7 | 15.6 | 2.68 |
| 8 | 16.2 | 2.78 |
| 9 | 16.6 | 2.85 |
| 10 | 16.8 | 2.88 |
| 15 | 18.2 | 3.12 |
| 20 | 18.85 | 3.24 |

About 3.2 liters of clear liquid was decanted from the cylinder and the remainder filtered through a specially devised sand filter. The filter had the following dimensions:

Cm.
Diameter _____ 14.8
Depth of sand _____ 9.0
Void above sand _____ 12.0

The volume of sand in the filter was 1.54 liters. The surface of the sand was scraped gently as the filtration proceeded. Neither pressure nor vacuum was applied, as the 12.0 cm. of hydrostatic pressure existing in the filter appeared to suffice. The rate of filtration was greatly accelerated by this means, the result being:

| Time (min.) | 1 | 2 | 3 | 4 | 5 | 6 |
| --- | --- | --- | --- | --- | --- | --- |
| Ml. filtered/min | 580 | 560 | 750 | 650 | 770 | 600 |

The average rate was 651 ml./min. which is equivalent to 37.84 liters/min./sq. meter of filter surface. The decanted liquor was also filtered through the sand filter and the filtration rate proved to be about the same as for the first portion. This indicated, that, with the sand filtration apparatus, the precipitate formed by the CaSO₄ caused practically no impedance to the flow of liquid through the filter. The combined filtrates analyzed as follows: Bx, 9.8; percent sucrose, 8.9; purity, 90.8. The precipitate on the surface of the sand had a thickness of about 5 mm. some of it having penetrated the sand to a depth of 3–4 cm.

EXAMPLE 9

To another 8.0 liters of the effluent obtained in Example 8, there was added 8 ml. of 30% CaCl₂ (=24.4 g. CaCl₂ or 0.03% on juice). The liquid was filtered through the sand filter described above, the surface of the sand being scraped gently during the filtration. The rate of filtration was as follows:

| Time (min.) | 1 | 2 | 3 | 4 | 5 | 6 | 7 | 8 | 9 |
| --- | --- | --- | --- | --- | --- | --- | --- | --- | --- |
| Ml. filtered per min | 900 | 940 | 900 | 710 | 810 | 750 | 760 | 650 | 665 |

The average rate was 797 ml./min. This is equivalent to 46.34 liters per minute per square meter of filter surface. The filtrate analyzed as follows: Bx, 9.8; percent sucrose, 9.2; purity, 93.87.

The data in Examples 6–9 clearly illustrate various modes for practicing the present invention on a commercial scale. Although the use of CaSO₄ or CaCl₂ to form the precipitates in accordance with the present invention is far more practical than the Al₂(SO₄)₃ of my prior disclosure for the many reasons set forth above and particularly because it greatly minimizes the time and costly equipment needed to filter off the precipitate, there are numerous further optional modifications which could be employed.

The use of a simple sand filter has already been mentioned. In the operation of this filter, the solution being filtered is passed down through the bed of sand while a rake connected therein is gently worked so as to agitate the surface of the sand bed and break up any caked formation there. When the filter is to be regenerated, water is passed upward through the sand bed and out through the top of the column. This will wash out of the column the sediment formed at the top of the bed. A sedimentation tank serves to clarify the water used for backwash, and this clarification permits its being recirculated through the bed of sand. When the backwash water from the sand bed is clear, it is sent to a storage tank rather than through the sedimentation tank. When the sand bed is to be regenerated, this stored water is reused. This re-use of the same water for backwashing serves as a means of recovering the sugar remaining in the bed after the filtration operation. Through continuous re-use, the backwash water accumulates a substantial percentage of sugar; and, when the concentration builds up sufficiently, the solution may be processed to recover the sugar.

Although the described sand filter may be a preferred mode of operation, there are numerous other ways for treating the juices after addition of the calcium salts and the formation of a precipitate thereby. For example, if sedimentation equipment such as the commercially available Dorr thickener is used, as much as 90% of clear juice can be obtained and only about 10% of sediment need be filtered. If only a simple sedimentation tank is available, and natural settling is relied upon, the clear fraction is about 65% and 35% must be filtered. If no sedimentation equipment is available, the entire batch will be sent through the filters. Of course, in all of these three types of filtration operations, filter time will be saved in proportion to the degree of clarification that can be effected by sedimentation.

The sugar obtained by the methods described above is often an entirely acceptable white product, depending on the type of juice being processed. In those cases where there remain traces of organic materials which may be the source of a slight discoloration, and in those cases where there are some inorganic salts present, it may be desirable to further treat this sugar solution, in one of the conventional ways, with anionic and cationic resins. For example, the solution may be passed through a quaternary ammonium hydroxide resin consisting of cross-linked styrene resin having trimethyl-ammonium methyl groups and then through a carboxylic cation-exchange resin in hydrogen form at a rate of two gallons per cubic foot per minute. This resin is one formed by copolymerizing methacrylic acid with a few percent of divinylbenzene. Alternatively, there may be employed a mixed bed of anionic and cationic resins in lieu of the two separate beds. A mixed bed could also be employed as a pretreatment in the case of molasses, before subjecting the sugar juices to the process of this invention.

As an incident to the separation accomplished by the present invention, there may be recovered from the filter cake, after the sedimentation and filtration steps described above, various amino acids such as glutamic acid, aspartic acid, and leucine which originally were present in the sugar or molasses solutions.

As one of the numerous modifications to the process herein described, some of which have already been mentioned and others of which will be obvious to those skilled in the art, mention may be made of the fact that the temperature at which the sugar juices are treated can be varied from room temperature to a considerably higher level. Running the process at room temperature has its advantages in the saving of fuel, etc.; but the elevated temperature is sometimes desirable in order to accelerate filtration. In fact, with even the more difficult precipitates to filter, at the higher temperatures (on the order of 40°–50° C.), flocculation is considerably improved and filtration can proceed at a rate of about 42–49 liters/min./sq. meter, even without a filter aid. Of course, well-known filter aids such as Sucragel et al. may be used, if desired.

Still other modifications will be obvious expedients to those skilled in the art to which this invention relates. For example, any strongly basic anion-exchange resins, in the hydroxide form, may be employed to convert the salts in the sugar juices to the corresponding hydroxides before treatment with calcium chloride or sulfate. Conceivably, a mixed bed or a two-bed system may even be employed, if desired, providing the arrangement of the bed or the order of treatment were such that the sugar juice-containing effluent therefrom was in the hydroxide form.

In view of the fact that certain features of the invention can be practiced in a variety of ways, all within the scope of the novel concept herein disclosed, I believe it proper that I should not be limited merely to the examples, etc., herein disclosed by way of illustration. Instead, the breadth of the invention should be measured by the claims which follow.

I claim:

1. Process for the purification of sugar juices by means of synthetic ion-exchange resins comprising first treating the sugar juices at least at room temperature with a strongly basic anion-exchange resin in the hydroxide form so as to give the juices a highly alkaline pH, next treating the juices with a member of the class consisting of calcium sulfate and calcium chloride, and finally removing the insoluble salts from the thus purified sugar juices.

2. Process according to claim 1 wherein the calcium salt employed is calcium sulfate.

3. Process according to claim 1 wherein the calcium salt employed is calcium chloride.

4. Process according to claim 1 wherein the strongly basic anion-exchange resin is one component of a mixed bed of anion- and cation-exchange resins so devised that the sugar juice-containing effluent therefrom is in the hydroxide form.

5. Process according to claim 1 wherein the strongly basic anion-exchange resin is one component of a two-bed system of anion- and cation-exchange resins, the system being so arranged that the sugar juice-containing effluent treated thereby is in the hydroxide form.

6. Process according to claim 1 wherein the juices obtained after removal of the salts is first treated with a strongly basic anionic resin and subsequently with a weakly acidic cationic resin.

7. Process according to claim 1 wherein the juice obtained after removal of the salts is treated with an anionic resin in basic form and with a cationic resin in hydrogen form.

8. Process according to claim 1 wherein the juice obtained after removal of the salts is treated with a mixed bed of anionic and cationic resins.

9. Process according to claim 1 wherein the sugar juices treated are derived from molasses, said process comprising first treating the molasses with a mixed bed of anionic and cationic resins, and then treating the effluent therefrom with a strongly basic anionic exchange resin in the hydroxide form, followed by treatment with the calcium salt and separation of the insoluble salts from the thus purified sugar juices.

References Cited in the file of this patent

UNITED STATES PATENTS

| | | |
|---|---|---|
| 2,155,318 | Liebknecht | Apr. 18, 1939 |
| 2,635,061 | McBurney | Aug. 14, 1953 |
| 2,649,390 | Winters et al. | Apr. 18, 1953 |